United States Patent
Lee et al.

(10) Patent No.: US 7,808,933 B2
(45) Date of Patent: Oct. 5, 2010

(54) CASCADE-TYPE MULTIPLEX RADIO COMMUNICATION RELAY SYSTEM

(75) Inventors: Jun Goo Lee, Seoul (KR); Ri Hong Lee, Seoul (KR); Sang Seob Lee, Suwon (KR); Sang Hoon Oh, Seoul (KR); Byung Sun Ahn, Seoul (KR)

(73) Assignee: Inkel Corporation, Incheon (KR)

( * ) Notice: Subject to any disclaimer, the term of this patent is extended or adjusted under 35 U.S.C. 154(b) by 86 days.

(21) Appl. No.: 12/337,368

(22) Filed: Dec. 17, 2008

(65) Prior Publication Data

US 2009/0279456 A1    Nov. 12, 2009

(30) Foreign Application Priority Data

May 8, 2008    (KR) .................. 10-2008-0042960

(51) Int. Cl.
    *H04B 7/14*    (2006.01)
(52) U.S. Cl. .................. 370/279; 370/465; 370/401
(58) Field of Classification Search .......... 370/276, 370/277, 279, 293, 246, 401, 465, 466, 467
See application file for complete search history.

(56) References Cited

U.S. PATENT DOCUMENTS

| | | | |
|---|---|---|---|
| 6,292,652 B1 * | 9/2001 | Kim | 455/20 |
| 6,337,754 B1 * | 1/2002 | Imajo | 398/115 |
| 2004/0258414 A1 * | 12/2004 | Lee | 398/115 |
| 2009/0286474 A1 * | 11/2009 | Park et al. | 455/20 |

* cited by examiner

*Primary Examiner*—Ricky Ngo
*Assistant Examiner*—Gary Mui
(74) *Attorney, Agent, or Firm*—IPLA P.A.; James E. Bame

(57) ABSTRACT

A cascade-type multiplex radio communication relay system, in which a donor and a Main Hub Unit (MHU) are connected to each other through an Unshielded Twisted Pair (UTP) cable to enable duplex communication, and in which a plurality of remote units are connected to the MHU through UTP cables to enable duplex communication. The cascade-type multiplex radio communication relay system adopts a method of converting at least two different RF communication signals into a single UTP transmission frame, and relaying the UTP transmission frame through a UTP cable in a digital communication manner.

6 Claims, 6 Drawing Sheets

CASCADE-TYPE MULTIPLEX RADIO COMMUNICATION RELAY SYSTEM

CROSS REFERENCE

This application claims foreign priority under Paris Convention and 35 U.S.C. §119 to Korean Patent Application No. 10-2008-0042960, filed May 8, 2008 with the Korean Intellectual Property Office.

BACKGROUND OF THE INVENTION

1. Field of the Invention

The present invention relates generally to a cascade-type multiplex radio communication relay system for relaying communication from a transmitting station to a propagation shadow area, and, more particularly, to a cascade-type multiplex radio communication relay system, in which a donor and a Main Hub Unit (MHU) are connected to each other through an Unshielded Twisted Pair (UTP) cable to enable duplex communication, and in which a plurality of remote units are connected to the MHU through UTP cables to enable duplex communication.

2. Description of the Related Art

As well known to those skilled in the art, base stations are installed at locations suitable for either communication with land mobile stations or communication based on relaying through mobile relay stations. However, high costs are required for the construction and operation of base stations. Accordingly, in locally formed propagation shadow areas which result from propagation interference or the existence of physical obstacles, such as happens in the case of the insides of buildings, subways, underground passages or tunnels, separate communication relay systems are constructed in order to relay communications for such a propagation shadow area.

A communication relay system using coaxial cables has been proposed and used as a conventional communication relay system for relaying communications of a propagation shadow area, but is disadvantageous in that coaxial cables not only are expensive but also have a low transfer rate and high transmission loss.

Therefore, as a substitute for the communication relay system using coaxial cables, a communication relay system using UTP cables has been proposed. Such a communication relay system using UTP cables is advantageous in that UTP cables are very cheap, are easily installed, and have a higher transfer rate than coaxial cables, but is disadvantageous in that, since such a UTP cable has a short transmission distance (of typically less than 100 m), the range of the application thereof is restricted, and in that there are limitations in complying with high-speed and wide-band characteristics that are required because of the development of the technology.

Accordingly, a communication relay system using optical cables has been developed. Such an optical cable is advantageous in that a large amount of data can be transmitted at high speed and the costs of the optical cable are inexpensive, but is disadvantageous in that it is not easy to handle and install the optical cable, thus making it difficult to extend a communication relay system.

Meanwhile, a radio communication relay system capable of relaying communication from a base station in a wireless manner has been developed. Such a radio communication relay system is disadvantageous in that a communication relay function is inferior to a wired communication relay system due to propagation characteristics, and requires large installation costs, but is advantageous in that, since the radio communication relay system can be freely and conveniently installed, it is very beneficial for network installations in places having complicated wire connections, such as department stores, hospitals, and museums, and places requiring temporary network connections, such as exhibition centers, seminar centers and construction sites.

However, since such a conventional radio communication relay system adopts a method of transmitting analog data, the extension of the communication relay system is limited, transmission loss is relatively high, and multiplex communication relay is difficult, and thus there occurs a problem in that the communication relay system cannot be efficiently used.

SUMMARY OF THE INVENTION

Accordingly, the present invention has been made keeping in mind the above problems occurring in the prior art, and an object of the present invention is to provide a cascade-type multiplex radio communication relay system, which enables a communication relay system to be easily extended, realizes an excellent communication relay function, and enables a communication relay system to be efficiently used.

In order to accomplish the above object, the present invention provides a cascade-type multiplex radio communication relay system, comprising a donor for separating a Radio Frequency (RF) communication signal, input from an antenna in a downstream direction, into two different RF communication signals, separately converting the two different RF communication signals into digital communication signals, converting the two different RF communication signals, which have been separately converted, into a single Unshielded Twisted Pair (UTP) transmission frame, outputting the UTP transmission frame to a Main Hub Unit (MHU) through a UTP cable, converting a UTP transmission frame, input from the MHU through the UTP cable in an upstream direction, into two different digital communication signals, separately converting the digital communication signals into two different RF communication signals, and outputting the two different RF communication signals, which have been separately converted, to the antenna in an upstream direction; the MHU for converting the UTP transmission frame, input from the donor through the UTP cable in a downstream direction, into a digital communication signal, separating and converting the digital communication signal into a plurality of UTP transmission frames, separately outputting the UTP transmission frames to a plurality of Remote Units (RUs) through UTP cables, separately converting a plurality of UTP transmission frames, input from the RUs through the UTP cables in an upstream direction, into a plurality of digital communication signals, combining the plurality of digital communication signals into a single digital communication signal, converting the combined digital communication signal into a UTP transmission frame, and outputting the UTP transmission frame to the donor through the UTP cable in an upstream direction; and the plurality of RUs, each converting a UTP transmission frame, input from the MHU 200 through a corresponding UTP cable in a downstream direction, into two different digital communication signals, separately converting the two different digital communication signals into RF communication signals, outputting the RF communication signals, which have been separately converted, to a corresponding antenna in a downstream direction, separating an RF communication signal, input from the antenna in an upstream direction, into two different RF communication signals, separately converting the two different RF communication signals into digital communication signals, converting the digital communication signals into a single UTP transmission frame, and outputting the UTP transmission frame to the MHU through a corresponding UTP cable in an upstream direction.

BRIEF DESCRIPTION OF THE DRAWINGS

The above and other objects, features and other advantages of the present invention will be more clearly understood from the following detailed description taken in conjunction with the accompanying drawings, in which:

FIGS. 5 and 6 are diagrams showing a cascade-type multiplex radio communication relay system according to another embodiment of the present invention, wherein FIG. 5 shows a diagram corresponding to FIG. 2 and FIG. 6 shows a diagram corresponding to FIG. 4.

DESCRIPTION OF THE PREFERRED EMBODIMENTS

Hereinafter, embodiments of the present invention will be described in detail with reference to the attached drawings.

Figure 1:
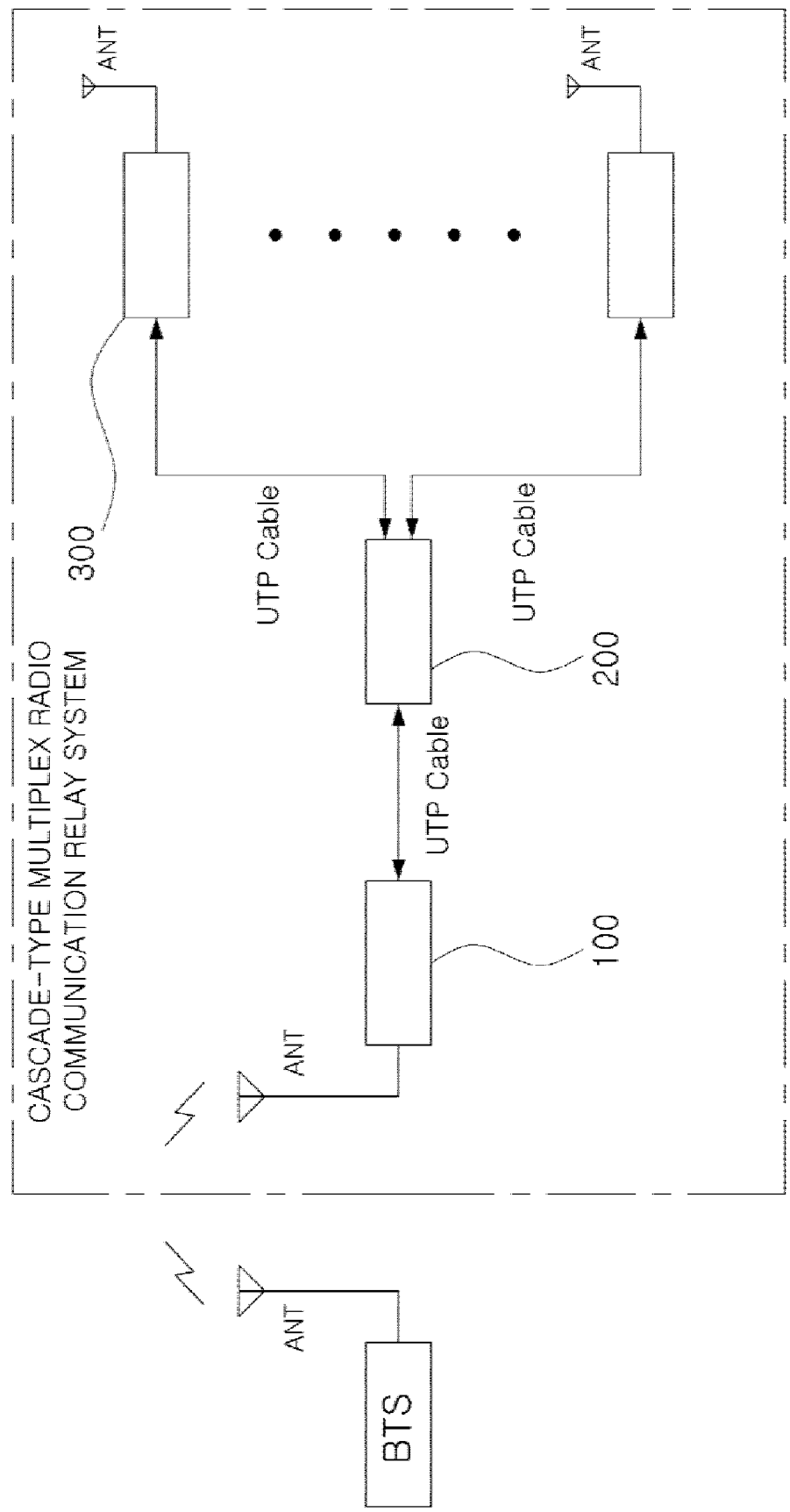
FIG. 1 is a diagram showing a cascade-type multiplex radio communication relay system according to the present invention.

Referring to FIG. 1, a cascade-type multiplex radio communication relay system according to the present invention includes a donor 100 for transmitting or receiving in a multiplex radio communication manner two different RF communication signals to or from a transmitting station, such as a Base Transceiver Station (BTS), a Main Hub Unit (MHU) 200 connected to the donor 100 through a UTP cable to enable duplex communication, and a plurality of Remote Units (RUs) 300 separately connected to the MHU 200 through UTP cables to enable duplex communication.

The donor 100 separates a Radio Frequency (RF) communication signal, input from an antenna in a downstream direction, into two different RF communication signals, separately converts the RF communication signals into digital communication signals, converts the two different digital communication signals, which have been separately converted, into a single UTP transmission frame, and outputs the UTP transmission frame to the MHU 200 via the UTP cable in the downstream direction. Further, the donor 100 converts a UTP transmission frame, input from the MHU 200 through the UTP cable in an upstream direction, into two different digital communication signals, separately convert the two different digital communication signals into RF communication signals, and outputs the two different RF communication signals, which have been separately converted, to the antenna in the upstream direction.

The MHU 200 converts the UTP transmission frame, input from the donor 100 through the UTP cable in the downstream direction, into a digital communication signal, separates and converts the digital communication signal into a plurality of UTP transmission frames, and separately outputs the UTP transmission frames to the plurality of RUs 300 through UTP cables. Further, the MHU 200 separately converts a plurality of UTP transmission frames, input from the RUs 200 through the UTP cables in the upstream direction, into a plurality of digital communication signals, combines the plurality of digital communication signals into a single digital communication signal, converts the combined digital communication signal into a UTP transmission frame, and outputs the UTP transmission frame to the donor 100 through the UTP cable in the upstream direction.

Each RU 300 converts a UTP transmission frame, input from the MHU 200 through a corresponding UTP cable in the downstream direction, into two different digital communication signals, separately converts the two different digital communication signals into RF communication signals, and outputs the RF communication signals, which have been separately converted, to a corresponding antenna in the downstream direction. Further, the RU 300 separates an RF communication signal, input from the antenna in the upstream direction, into two different RF communication signals, separately converts the two different RF communication signals into digital communication signals, converts the digital communication signals into a single UTP transmission frame, and outputs the UTP transmission frame to the MHU 200 through a corresponding UTP cable in the upstream direction.

Figure 2:
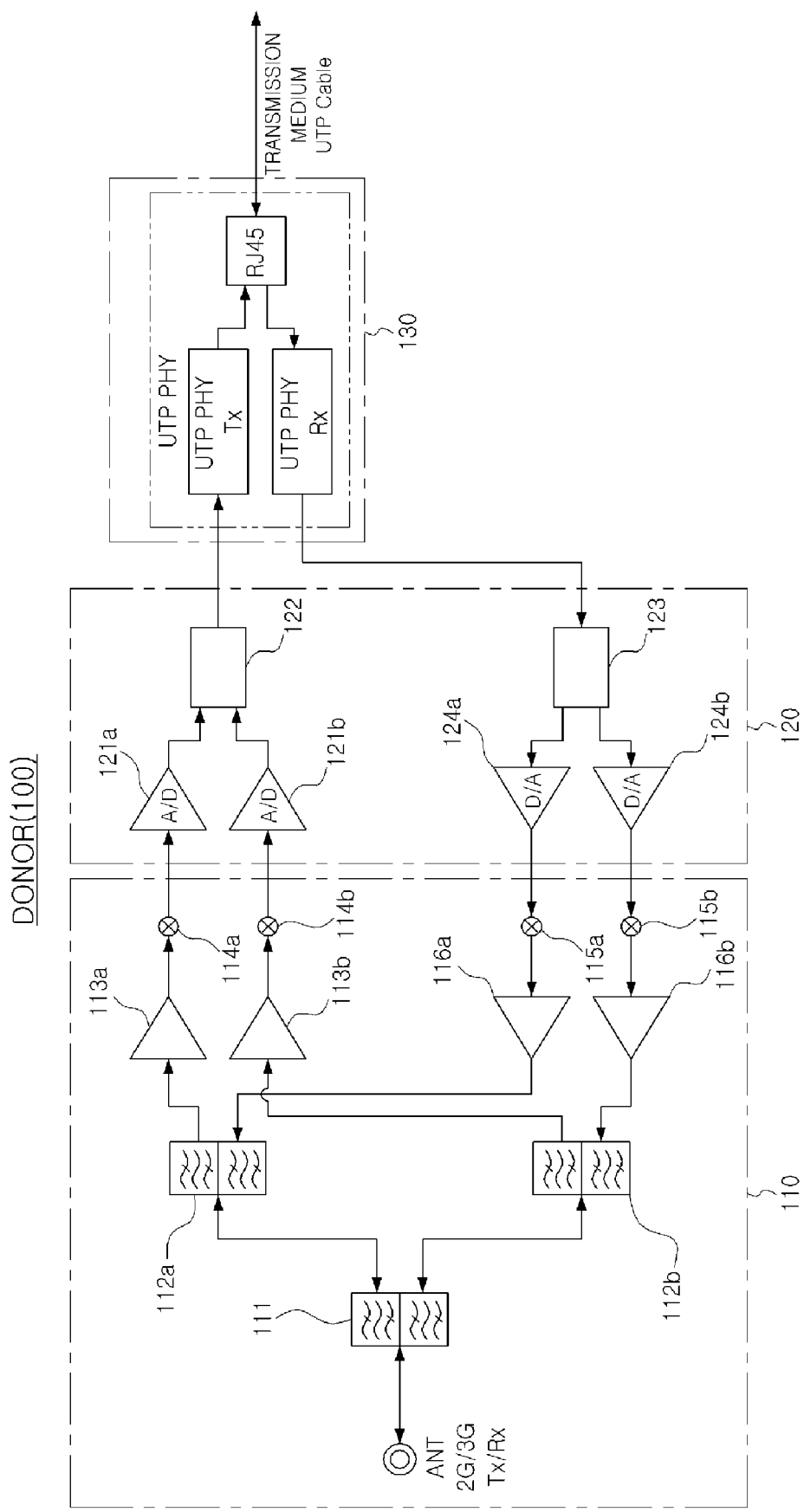
FIG. 2 is a diagram showing a donor according to a first embodiment of the present invention.
Figure 3:
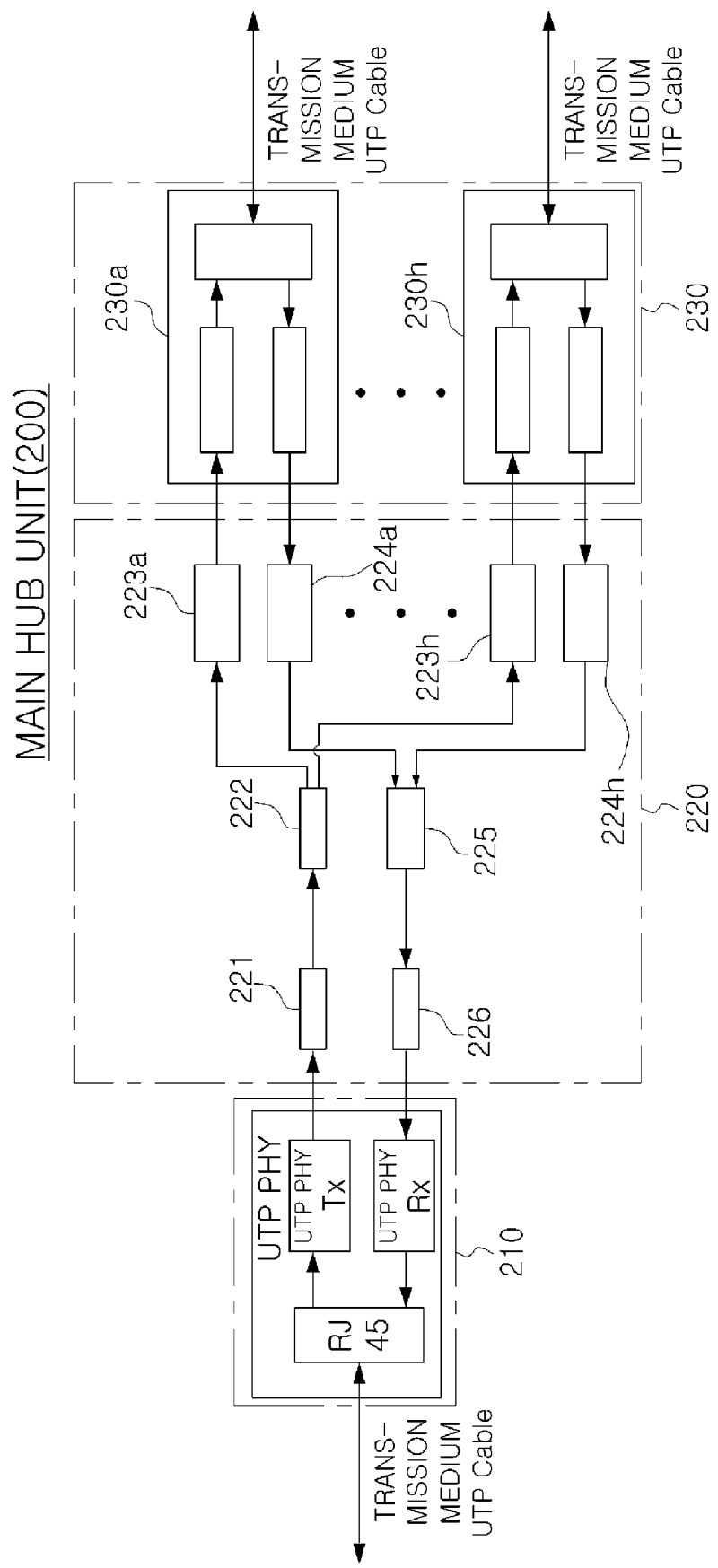
FIG. 3 is a diagram showing a main hub unit according to a first embodiment of the present invention.
Figure 4:
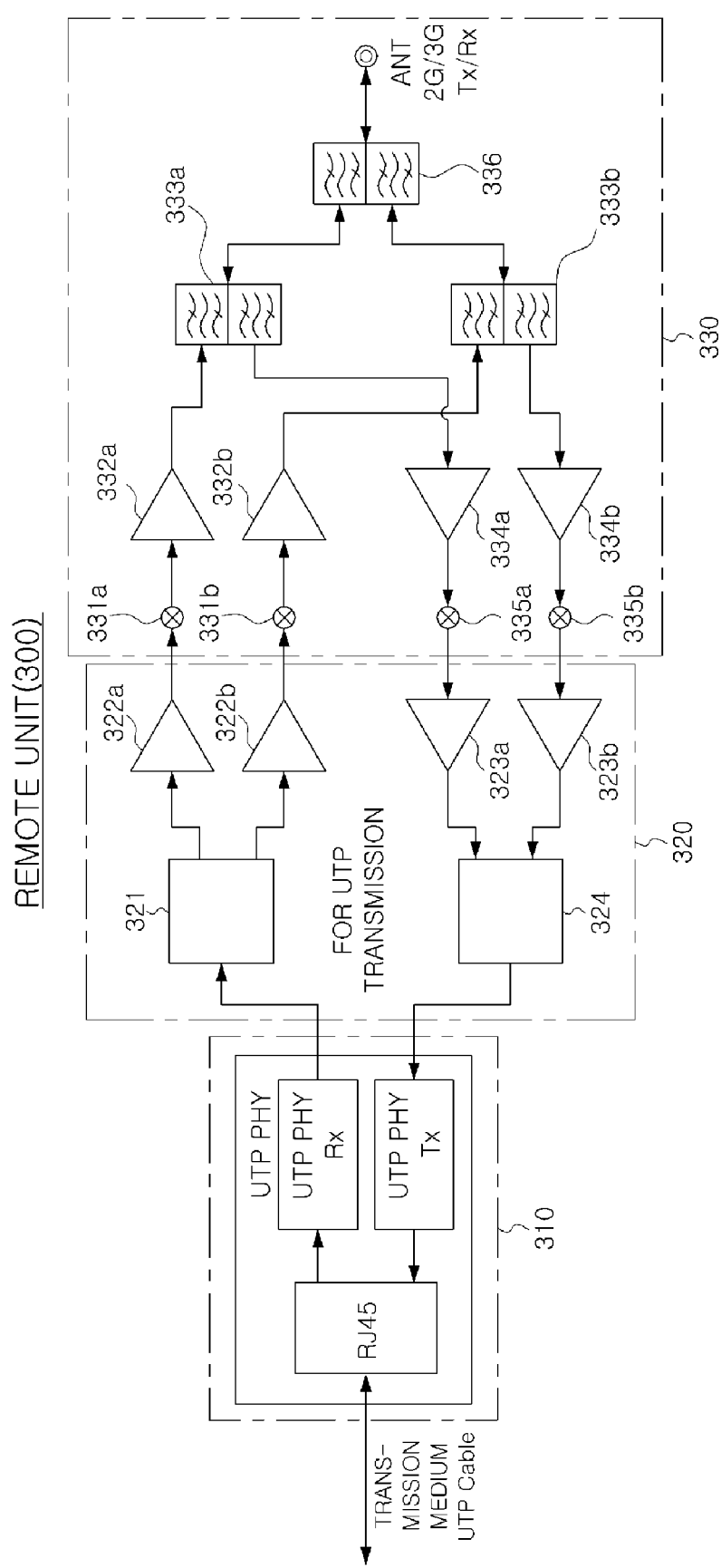
FIG. 4 is a diagram showing a remote unit according to a first embodiment of the present invention.

FIGS. 2 to 4 are diagrams showing a first embodiment of the present invention, and illustrate, in detail, a multiplex radio communication relay system for relaying two different RF communication signals in a radio communication manner.

Referring to FIG. 2, the donor 100 includes a donor radio communication interface 110, a donor communication signal processing unit 120, and a donor UTP interface 130. The donor radio communication interface 110 includes a diplexer 111, first and second duplexers 112a and 112b, a first downstream matching/amplification unit 113a, a second downstream matching/amplification unit 113b, a first downstream down-converter 114a, a second downstream down-converter 114b, first and second upstream up-converters 115a and 115b, a first upstream matching/amplification unit 116a, and a second upstream matching/amplification unit 116b. The diplexer 111 separates an RF communication signal, input from an antenna in a downstream direction, into two different RF communication signals, separately outputs the RF communication signals in the downstream direction, and outputs two different RF communication signals, which are separately input in an upstream direction, to the antenna in the upstream direction. The first and second duplexers 112a and 112b respectively output the two different RF communication signals, which are input from the diplexer 111 in the downstream direction, in the downstream direction, and outputs two different RF communication signals, which are separately input in the upstream direction, to the diplexer 111 in the upstream direction. The first downstream matching/amplification unit 113a amplifies an RF communication signal, which is input from the first duplexer 112a in the downstream direction, adjusts the level of the amplified RF communication signal, and outputs the level-adjusted RF communication signal in the downstream direction. The second downstream matching/amplification unit 113b amplifies an RF communication signal, which is input from the second duplexer 112b in the downstream direction, adjusts the level of the amplified RF communication signal, and outputs the level-adjusted RF communication signal in the downstream direction. The first downstream down-converter 114a converts the RF communication signal, input from the first downstream matching/amplification unit 113a in the downstream direction, into an Intermediate Frequency (IF) communication signal, and outputs the IF communication signal in the downstream direction. The second downstream down-converter 114b converts the RF communication signal, input from the second downstream matching/amplification unit 113b in the downstream direction, into an IF communication signal, and outputs the IF communication signal in the downstream direction. The first and second upstream up-converters 115a and 115b respectively convert two different IF communication signals, input from the donor communication signal processing unit 120 in the upstream direction, into RF communication signals, and output the RF communication signals in the upstream direction. The first upstream matching/amplification unit 116a adjusts the level of an RF communication signal, input from the first upstream up-converter 115a in the upstream direction, amplifies the level-adjusted RF communication signal, and outputs the amplified RF communication signal to the first duplexer 112a in the upstream direction. The second upstream matching/amplification unit 116b adjusts the level of an RF communication signal, input from the second upstream up-converter 115b in the upstream direction, amplifies the level-adjusted RF communication signal, and outputs the amplified RF communication signal to the second duplexer 112b in the upstream direction. The donor communication signal processing unit 120 includes first and second downstream Analog/Digital (A/D) converters 121a and 121b, a downstream UTP transmission framer 122, an upstream UTP transmission deframer 123, and first and second upstream D/A converters 124a and 124b. The first and second downstream (A/D) converters 121a and 121b respectively convert two different IF communication signals, which are separately input from the downstream down-converter 114a of the donor radio communication interface 110 in the downstream direction, into digital communication signals, and separately output the digital communication signals in the downstream direction. The downstream UTP transmission framer 122 separately converts the two different digital communication signals, which are separately input from the first and second downstream A/D converters 121a and 121b in the downstream direction, into a single UTP transmission frame, and outputs the UTP transmission frame to the donor UTP interface 130 in the downstream direction. The upstream UTP transmission deframer 123 converts a UTP transmission frame, which is input from the downstream UTP transmission framer 122 in the upstream direction, into two different digital communication signals, and separately outputs the digital communication signals in the upstream direction. The first and second upstream D/A converts 124a and 124b respectively convert the two different digital communication signals, input from the deframer 123 in the upstream direction, into IF communication signals, and separately output the IF communication signals to the donor radio communication interface 110 in the upstream direction. The donor UTP interface 130 outputs UTP transmission frames, which are separately input from the donor communication signal processing unit 120 in the downstream direction, to a UTP cable in the downstream direction, and outputs a UTP transmission frame, which is input through the UTP cable in an upstream direction, to the donor communication signal processing unit 120 in the upstream direction.

Referring to FIG. 3, the MHU 200 includes a first MHU UTP interface 210, an MHU communication signal processing unit 220, and a second MHU UTP interface 230. The first MHU UTP interface 210 outputs a UTP transmission frame, which is input from the donor 100 through a UTP cable in the downstream direction, to the MHU communication signal processing unit 220 in the downstream direction, and outputs a UTP transmission frame, which is input from the MHU communication signal processing unit 220 in the upstream direction, to the donor 100 through the UTP cable in the upstream direction. The MHU communication signal processing unit 220 includes a downstream UTP transmission deframer 221, a downstream divider 222, a plurality of downstream UTP transmission framers 223a to 223h, a plurality of upstream UTP transmission deframers 224a to 224h, an upstream summation unit 225, and an upstream UTP transmission framer 226. The downstream UTP transmission deframer 221 converts the UTP transmission frame, input from the first MHU UTP interface 210 in the downstream direction, into a digital communication signal, and outputs the digital communication signal in the downstream direction. The downstream divider 222 separates the digital communication signal, input from the downstream UTP transmission deframer 221 in the downstream direction, into a plurality of digital communication signals and separately outputs the digital communication signals in the downstream direction. The downstream UTP transmission framers 223a to 223h respectively convert the plurality of digital communication signals, which are separately input from the downstream divider 222 in the downstream direction, into UTP transmission frames, and separately output the UTP transmission frames in the downstream direction. The upstream UTP transmission deframers 224a to 224h respectively convert a plurality of UTP transmission frames, separately input from the second MHU UTP interface 230 in the upstream direction, into digital communication signals, and separately output the digital communication signals to the upstream summation unit 225 in the upstream direction. The upstream summation unit 225 combines the plurality of digital communication signals, separately input from the upstream UTP transmission deframers 224a to 224h in the upstream direction, into a single digital communication signal, and outputs the digital communication signal in the upstream direction. The upstream UTP transmission framer 226 converts the digital communication signal, input from the upstream summation unit 225 in the upstream direction, into a UTP transmission frame, and outputs the UTP transmission frame in the upstream direction. The second MHU UTP interface 230 separately outputs the plurality of UTP transmission frames, which are separately input from the downstream UTP transmission framers 223a to 223h in the downstream direction, to the plurality of RUs 300 through UTP cables in the downstream direction, and separately outputs a plurality of UTP transmission frames, which are separately input from the RUs 300 through UTP cables in the upstream direction, to the upstream UTP transmission deframers 224a to 224h in the upstream direction.

Referring to FIG. 4, each RU 300 includes an RU UTP interface 310, a RU communication signal processing unit 320, and an RU radio communication interface 330. The RU UTP interface 310 outputs a UTP transmission frame, input from the MHU 200 through a UTP cable in the downstream direction, to the RU communication signal processing unit 320 in the downstream direction, and outputs a UTP transmission frame, input from the RU communication signal processing unit 320 in the upstream direction, to the MHU 200 through the UTP cable in the upstream direction. The RU communication signal processing unit 320 includes a downstream UTP transmission deframer 321, first and second downstream D/A converters 322a and 322b, first and second upstream A/D converters 323a and 323b, and an upstream UTP transmission framer 324. The downstream UTP transmission deframer 321 converts a UTP transmission frame, which is input from the RU UTP interface 310 in the downstream direction, into two different digital communication signals, and separately outputs the digital communication signals in the downstream direction. The first and second downstream D/A converters 322a and 322b respectively convert the two different digital communication signals, input from the downstream deframer 321 in the downstream direction, into IF communication signals, and separately output the IF communication signals to the RU radio communication interface 330 in the downstream direction. The first and second upstream A/D converters 323a and 323b respectively convert the two different IF communication signals, input from the RU radio communication interface 330 in the upstream direction, into digital communication signals, and separately output the digital communication signals in the upstream direction. The upstream UTP transmission framer 324 converts two different digital communication signals, which are separately input from the first and second upstream A/D converters 323a and 323b in the upstream direction, into a single UTP transmission frame, and outputs the UTP transmission frame to the RU UTP interface 310 in the upstream direction. The RU radio communication interface 330 includes first and second downstream up-converters 331a and 331b, a first downstream matching/amplification unit 332a, a second downstream matching/amplification unit 332b, a first duplexer 333a, a second duplexer 333b, a first upstream matching/amplification unit 334a, a second upstream matching/amplification unit 334b, a first upstream down-converter 335a, a second upstream down-converter 335b, a second upstream down-converter 335b, and a diplexer 336. The first and second downstream up-converters 331a and 331b respectively convert two different IF communication signals, which are separately input from the RU communication signal processing unit 320 in the downstream direction, into RF communication signals, and separately output the RF communication signals in the downstream direction. The first downstream matching/amplification unit 332a adjusts the level of an RF communication signal, input from the first downstream up-converter 331a in the downstream direction, amplifies the level-adjusted RF communication signal, and outputs the amplified RF communication signal in the downstream direction. The second downstream matching/amplification unit 332b adjusts the level of an RF communication signal, input from the second downstream up-converter 331b in the downstream direction, amplifies the level-adjusted RF communication signal, and outputs the amplified RF communication signal in the downstream direction. The first duplexer 333a outputs the RF communication signal, input from the first downstream matching/amplification unit 332a in the downstream direction, in the downstream direction, and outputs an RF communication signal, input in the upstream direction, to the first upstream matching/amplification unit 334a in the upstream direction. The second duplexer 333b outputs the RF communication signal, input from the second downstream matching/amplification unit 332b in the downstream direction, in the downstream direction, and outputs an RF communication signal, input in the upstream direction, to the second upstream matching/amplification unit 334a in the upstream direction. The first upstream matching/amplification unit 334a amplifies the RF communication signal, input from the first duplexer 333a in the upstream direction, adjusts the level of the amplified RF communication signal, and outputs the level-adjusted RF communication signal in the upstream direction. The second upstream matching/amplification unit 334b amplifies the RF communication signal, input from the second duplexer 333b in the upstream direction, adjusts the level of the amplified RF communication signal, and outputs the level-adjusted RF communication signal in the upstream direction. The first upstream down-converter 335a converts the RF communication signal, input from the first upstream matching/amplification unit 334a in the upstream direction, into an IF communication signal, and outputs the IF communication signal to the RU communication signal processing unit 320 in the upstream direction. The second upstream down-converter 335b converts the RF communication signal, input from the second upstream matching/amplification unit 334b in the upstream direction, into an IF communication signal, and outputs the IF communication signal to the RU communication signal processing unit 320 in the upstream direction. The diplexer 336 outputs two different RF communication signals, separately input from the first and second duplexers 333a and 333b in the downstream direction, to the antenna in the downstream direction, separates an RF communication signal, input from the antenna in the upstream direction, into two different communication signals, and separately outputs the communication signals to the first and second duplexers 333a and 333b.

Meanwhile, the term "UTP PHY" shown in FIGS. 2 to 4 means a duplex UTP transceiver unit that constitutes each of the donor UTP interface 130, the first and second MHU interfaces 210 and 230, and the RU UTP interface 310. Such a UTP transceiver unit is well known to and implemented by those skilled in the art, and thus a detailed description thereof is omitted.

The cascade-type multiplex radio communication relay system according to the present invention is constructed such that the donor 100 separates an RF communication signal, input from the antenna in a downstream direction, into two different RF communication signals, separately converts the RF communication signals into IF communication signals, converts the IF signals into digital communication signals, converts the digital communication signals into a single UTP transmission frame, and outputs the UTP transmission frame to the MHU 200 through a UTP cable in the downstream direction. Further, the MHU 200 converts the UTP transmission frame, input from the donor 100 in the downstream direction, into a digital communication signal, converts the digital communication signal into a plurality of UTP transmission frames, and separately outputs the UTP transmission frames to the plurality of RUs 300 through UTP cables in the downstream direction. Further, each of the RUs 300 converts a corresponding UTP transmission frame, which is input through a corresponding UTP cable in the downstream direction, into two different digital communication signals, separately converts the digital communication signals into IF communication signals, converts the IF communication signals into RF communication signals, and outputs the RF communication signals to a corresponding antenna in the downstream direction.

Further, the RU 300 separates an RF communication signal, input from the antenna in the upstream direction, into two different RF communication signals, separately converts the RF communication signals into IF communication signals, converts the IF communication signals into digital communication signals, converts the digital communication signals into a single UTP transmission frame, and outputs the UTP transmission frame to the MHU 200 through a UTP cable in the upstream direction. Further, the MHU 200 separately converts a plurality of UTP transmission frames, input through UTP cables in the upstream direction, into digital communication signals, combines the plurality of digital communication signals into a single digital communication signal, converts the digital communication signal into a UTP transmission frame, and outputs the UTP transmission frame to the donor 100 through a UTP cable in the upstream direction. Further, the donor 100 converts the UTP transmission frame, input through the UTP cable in the upstream direction, into two different digital communication signals, separately converts the digital communication signals into IF communication signals, converts the IF communication signals into RF communication signals, and outputs the RF communication signals to the antenna in the upstream direction.

When at least two different radio communication signals are easily relayed in a multiplex radio communication manner using a single radio communication relay system, the cascade-type multiplex radio communication relay system according to the present invention is not limited to the embodiments shown in FIGS. 2 to 4, and can be variously applied as needed.

Figure 5:
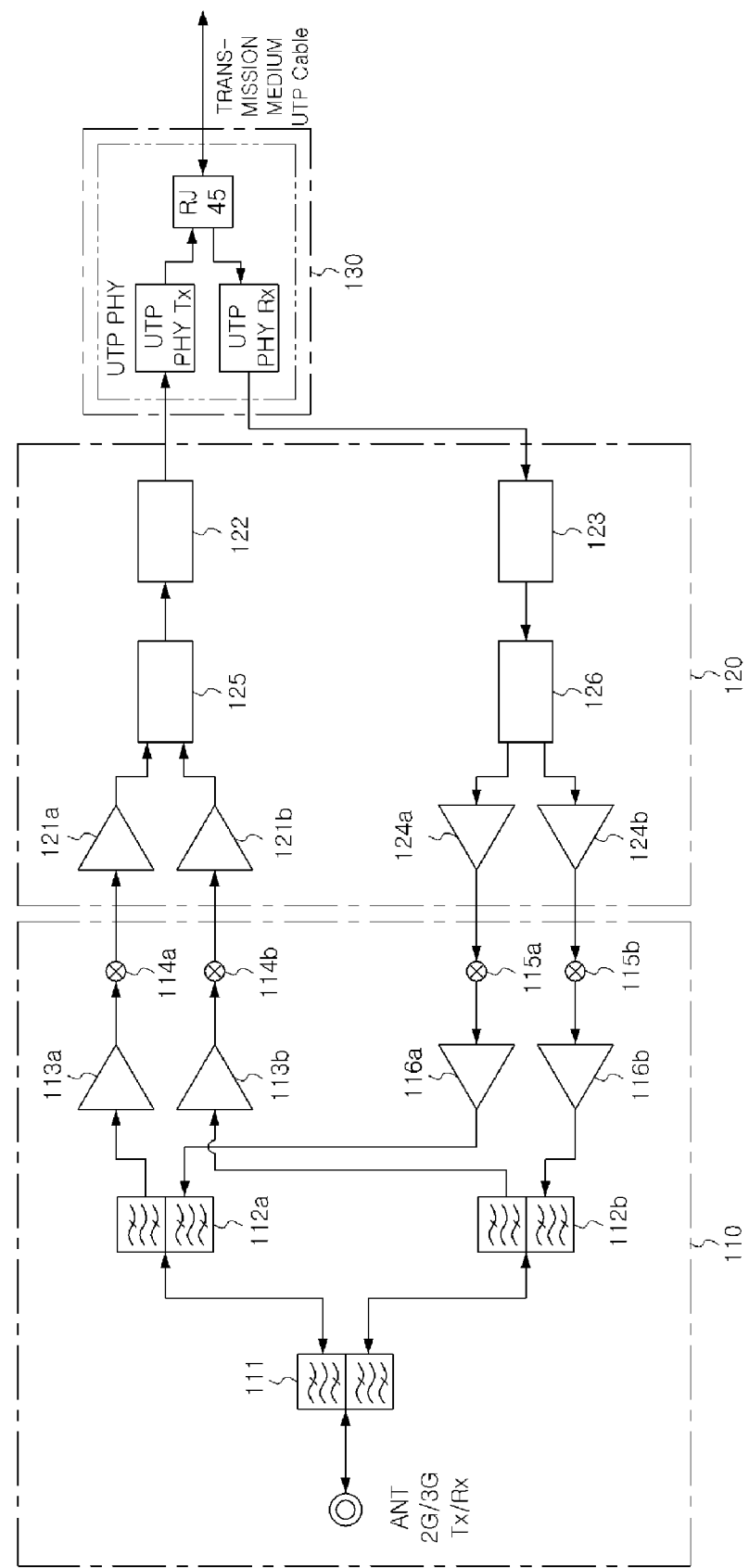
Figure 6:
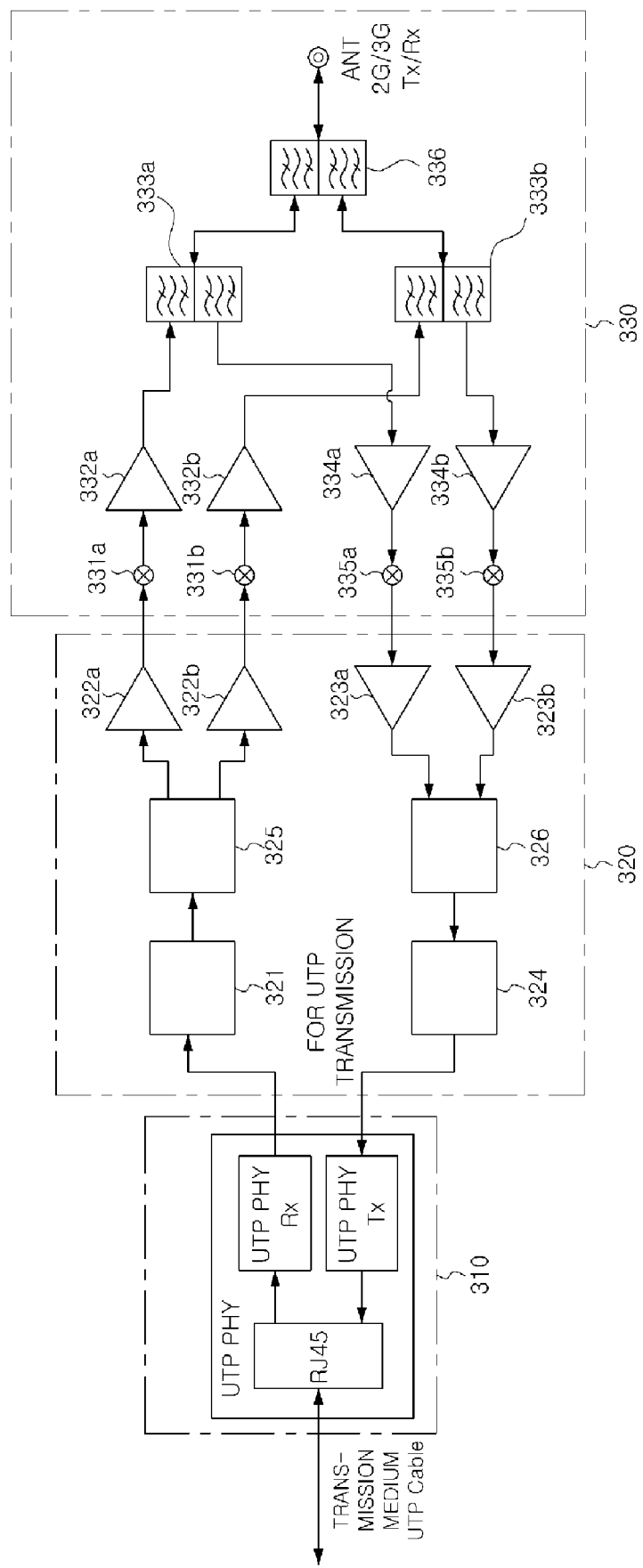

FIGS. 5 and 6 are diagrams showing another embodiment of a multiplex radio communication relay system according to the present invention.

Referring to FIG. 5, a donor communication signal processing unit 120, constituting the donor 100, includes first and second downstream A/D converters 121a and 121b, a downstream summation unit 125, a downstream UTP transmission framer 122, an upstream UTP transmission deframer 123, an upstream digital filter 126, and first and second upstream D/A converters 124a and 124b. The first and second downstream A/D converters 121a and 121b respectively convert two different IF communication signals, which are input from the downstream down-converter 114a of the donor radio communication interface 110 in the downstream direction, into digital communication signals, and separately output the digital communication signals in the downstream direction. The downstream summation unit 125 combines the two different digital communication signals, input from the first and second downstream A/D converters 121a and 121b in the downstream direction, into a single digital communication signal, and outputs the single digital communication signal in the downstream direction. The downstream UTP transmission framer 122 converts the digital communication signal, input from the downstream summation unit 125 in the downstream direction, into a UTP transmission frame, and outputs the UTP transmission frame to the donor UTP interface 130 in the downstream direction. The upstream UTP transmission deframer 123 converts the UTP transmission frame, input from the downstream UTP transmission framer 122 in the upstream direction, into a single digital communication signal, and outputs the digital communication signal in the upstream direction. The upstream digital filter 126 separates the digital communication signal, input from the upstream UTP transmission deframer 123 in the upstream direction, into two different digital communication signals, and separately outputs the digital communication signals in the upstream direction. The first and second upstream D/A converters 124a and 124b respectively convert the two different digital communication signals, input from the upstream digital filter 126 in the upstream direction, into IF communication signals, and separately output the IF communication signals to the donor radio communication interface 110 in the upstream direction.

Referring to FIG. 6, an RU communication signal processing unit 320 constituting the RU 300 includes a downstream UTP transmission deframer 321, a downstream digital filter 325, first and second downstream D/A converters 322a and 322b, first and second upstream A/D converters 323a and 323b, an upstream summation unit 326, and an upstream UTP transmission framer 324. The downstream UTP transmission deframer 321 converts a UTP transmission frame, which is input from the RU UTP interface 310 in the downstream direction, into a single digital communication signal, and outputs the digital communication signal in the downstream direction. The downstream digital filter 325 converts the digital communication signal, input from the downstream UTP transmission deframer 321 in the downstream direction, into two different digital communication signals, and separately outputs the digital communication signals in the downstream direction. The first and second downstream D/A converters 322a and 322b respectively convert the two different digital communication signals, input from the downstream digital filter 325 in the downstream direction, into IF communication signals, and separately output the IF communication signals to the RU radio communication interface 330 in the upstream direction. The first and second upstream A/D converters 323a and 323b respectively convert the two IF communication signals, input from the RU radio communication interface 330 in the upstream direction, into digital communication signals, and separately output the digital communication signals. The upstream summation unit 326 combines the two different digital communication signals, which are separately input from the first and second upstream A/D converters 323a and 323b in the upstream direction, into a single digital communication signal, and outputs the digital communication signal to the upstream UTP transmission framer 324 in the upstream direction. The upstream UTP transmission framer 324 converts the two different digital communication signals, separately input from the first and second upstream A/D converters 323a and 323b in the upstream direction, into a single UTP transmission frame, and outputs the UTP transmission frame to the RU UTP interface 310 in the upstream direction.

Meanwhile, in this embodiment, the MHU 200 of FIG. 3 is also equally used as the MHU, and thus a detailed description thereof is omitted.

It is apparent that the present invention is not limited to the above-described embodiments, and can be freely and variously modified and implemented within the scope of the accompanying claims.

According to the present invention, a donor converts two different RF communication signals, which are input from a transmitting station in a downstream direction in a radio communication manner, into a single UTP transmission frame, and outputs the UTP transmission frame to a Main Hub Unit (MHU) through a UTP cable in a downstream direction. Further, the MHU converts the UTP transmission frame, input through the UTP cable in the downstream direction, into a digital communication signal, separates and converts the digital communication signal into a plurality of UTP transmission frames, and separately outputs the UTP transmission frames to a plurality of remote units through UTP cables in the downstream direction. Each remote unit coverts a corresponding UTP transmission frame, input through a corresponding UTP cable in the downstream direction, into two different RF communication signals, and outputs the RF communication signals to the outside of the remote unit in the downstream direction in a radio communication manner. Meanwhile, the remote unit converts two different RF communication signals, externally input in an upstream direction, into a single UTP transmission frame, and outputs the UTP transmission frame to the MHU through the UTP cable in the upstream direction. The MHU converts UTP transmission frames, separately input from the remote units through the UTP cables in the upstream direction, into digital communication signals, combines the digital communication signals into a single digital communication signal, converts the digital communication signal into a UTP transmission frame, and outputs the UTP transmission frame to the donor through the UTP cable in the upstream direction. The donor converts the UTP transmission frame, input through the UTP cable in the upstream direction, into two different RF communication signals, and outputs the RF communication signals to the transmitting station in the upstream direction in a radio communication manner.

Therefore, the present invention is advantageous in that communication relay performance is excellent and the extension of a communication relay system is facilitated, and in that use efficiency of the communication relay system is greatly improved because different radio communication signals can be relayed in a multiplex communication manner using a single communication relay system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cascade-type multiplex radio communication relay system, comprising:

a donor for separating a Radio Frequency (RF) communication signal, input from an antenna in a downstream direction, into two different RF communication signals, separately converting the two different RF communication signals into digital communication signals, converting the two different RF communication signals, which have been separately converted, into a single Unshielded Twisted Pair (UTP) transmission frame, outputting the UTP transmission frame to a Main Hub Unit (MHU) through a UTP cable, converting a UTP transmission frame, input from the MHU through the UTP cable in an upstream direction, into two different digital communication signals, separately converting the digital communication signals into two different RF communication signals, and outputting the two different RF communication signals, which have been separately converted, to the antenna in an upstream direction;

the MHU for converting the UTP transmission frame, input from the donor through the UTP cable in a downstream direction, into a digital communication signal, separating and converting the digital communication signal into a plurality of UTP transmission frames, separately outputting the UTP transmission frames to a plurality of Remote Units (RUs) through UTP cables, separately converting a plurality of UTP transmission frames, input from the RUs through the UTP cables in an upstream direction, into a plurality of digital communication signals, combining the plurality of digital communication signals into a single digital communication signal, converting the combined digital communication signal into a UTP transmission frame, and outputting the UTP transmission frame to the donor through the UTP cable in an upstream direction; and the plurality of RUs, each converting a UTP transmission frame, input from the MHU 200 through a corresponding UTP cable in a downstream direction, into two different digital communication signals, separately converting the two different digital communication signals into RF communication signals, outputting the RF communication signals, which have been separately converted, to a corresponding antenna in a downstream direction, separating an RF communication signal, input from the antenna in an upstream direction, into two different RF communication signals, separately converting the two different RF communication signals into digital communication signals, converting the digital communication signals into a single UTP transmission frame, and outputting the UTP transmission frame to the MHU through a corresponding UTP cable in an upstream direction.

2. The cascade-type radio communication relay system according to claim 1, wherein the donor comprises:

a donor radio communication interface including a diplexer for separating the RF communication signal, input from the antenna in a downstream direction, into two different RF communication signals, separately outputting the RF communication signals in a downstream direction, and outputting two different RF communication signals, separately input in an upstream direction, to the antenna in an upstream direction, first and second duplexers for respectively outputting the two different RF communication signals, input from the diplexer in a downstream direction, in a downstream direction, and outputting two different RF communication signals, separately input in an upstream direction, to the diplexer in an upstream direction, a first downstream matching/amplification unit for amplifying an RF communication signal, input from the first duplexer in a downstream direction, adjusting a level of the amplified RF communication signal, and outputting the level-adjusted RF communication signal in a downstream direction, a second downstream matching/amplification unit for amplifying an RF communication signal, input from the second duplexer in a downstream direction, adjusting a level of the amplified RF communication signal, and outputting the level-adjusted RF communication signal in a downstream direction, a first downstream down-converter for converting the RF communication signal, input from the first downstream matching/amplification unit in a downstream direction, into an Intermediate Frequency (IF) communication signal and outputting the IF communication signal in a downstream direction, a second downstream down-converter for converting the RF communication signal, input from the second downstream matching/amplification unit in a downstream direction, into an IF communication signal, and outputting the IF communication signal in a downstream direction, first and second upstream up-converters for respectively converting two different IF communication signals, input from a donor communication signal processing unit in an upstream direction, into RF communication signals, and outputting the RF communication signals in an upstream direction, a first upstream matching/amplification unit for adjusting a level of an RF communication signal, input from the first upstream up-converter in an upstream direction, amplifying the level-adjusted RF communication signal, and outputting the amplified RF communication signal to the first duplexer in an upstream direction, and a second upstream matching/amplification unit for adjusting a level of an RF communication signal, input from the second upstream up-converter in an upstream direction, amplifying the level-adjusted RF communication signal, and outputting the amplified RF communication signal to the second duplexer in an upstream direction;

the donor communication signal processing unit including first and second downstream (A/D) converters for respectively converting two different IF communication signals, which are separately input from the downstream down-converter of the donor radio communication interface in a downstream direction, into digital communication signals, and separately outputting the digital communication signals in a downstream direction, a downstream UTP transmission framer for separately converting the two different digital communication signals, separately input from the first and second downstream A/D converters in a downstream direction, into a single UTP transmission frame, and outputting the UTP transmission frame to the donor UTP interface in a downstream direction, an upstream UTP transmission deframer for converting a UTP transmission frame, input from the downstream UTP transmission framer in an upstream direction, into two different digital communication signals, and separately outputting the digital communication signals in an upstream direction, and first and second upstream D/A converts for respectively converting the two different digital communication signals, input from the deframer in an upstream direction, into IF communication signals, and separately outputting the IF communication signals to the donor radio communication interface in an upstream direction; and a donor UTP interface for outputting UTP transmission frames, separately input from the donor communication signal processing unit in a downstream direction, to a UTP cable in a downstream direction, and outputting a UTP transmission frame, input through the UTP cable in an upstream direction, to the donor communication signal processing unit in an upstream direction.

3. The cascade-type multiplex radio communication relay system according to claim 2, wherein the donor communication signal processing unit includes:

first and second downstream A/D converters for respectively converting two different IF communication signals, which are input from the downstream down-converter of the donor radio communication interface in a downstream direction, into digital communication signals, and separately outputting the digital communication signals in a downstream direction;

a downstream summation unit for combining the two different digital communication signals, input from the first and second downstream A/D converters in a downstream direction, into a single digital communication signal, and outputting the single digital communication signal in a downstream direction;

a downstream UTP transmission framer for converting the digital communication signal, input from the downstream summation unit in a downstream direction, into a UTP transmission frame, and outputting the UTP transmission frame to the donor UTP interface in a downstream direction;

an upstream UTP transmission deframer for converting the UTP transmission frame, input from the downstream UTP transmission framer in an upstream direction, into a single digital communication signal, and outputting the digital communication signal in an upstream direction;

a upstream digital filter for separating the digital communication signal, input from the upstream UTP transmission deframer in an upstream direction, into two different digital communication signals, and separately outputting the digital communication signals in an upstream direction; and first and second upstream D/A converters for respectively converting the two different digital communication signals, input from the upstream digital filter in an upstream direction, into IF communication signals, and outputting the IF communication signals to the donor radio communication interface in an upstream direction.

4. The cascade-type multiplex radio communication relay system according to claim 1, wherein the MHU comprises:

a first MHU UTP interface for outputting a UTP transmission frame, input from the donor through a UTP cable in a downstream direction, to an MHU communication signal processing unit in a downstream direction, and outputting a UTP transmission frame, input from the MHU communication signal processing unit in an upstream direction, to the donor through the UTP cable in an upstream direction;

the MHU communication signal processing unit including a downstream UTP transmission deframer for converting the UTP transmission frame, input from the first MHU UTP interface in a downstream direction, into a digital communication signal, and outputting the digital communication signal in a downstream direction, a downstream divider for separating the digital communication signal, input from the downstream UTP transmission deframer in a downstream direction, into a plurality of digital communication signals and separately outputting the digital communication signals in a downstream direction, a plurality of downstream UTP transmission framers for respectively converting the plurality of digital communication signals, separately input from the downstream divider in a downstream direction, into UTP transmission frames, and separately outputting the UTP transmission frames in a downstream direction, a plurality of upstream UTP transmission deframers for respectively converting a plurality of UTP transmission frames, separately input from the second MHU UTP interface in an upstream direction, into digital communication signals, and separately outputting the digital communication signals to an upstream summation unit in an upstream direction, the upstream summation unit for combining the plurality of digital communication signals, separately input from the upstream UTP transmission deframers in an upstream direction, into a single digital communication signal, and outputting the digital communication signal in an upstream direction, and an upstream UTP transmission framer for converting the digital communication signal, input from the upstream summation unit in an upstream direction, into a UTP transmission frame, and outputting the UTP transmission frame in an upstream direction; and a second MHU UTP interface for separately outputting the plurality of UTP transmission frames, separately input from the downstream UTP transmission framers in a downstream direction, to the plurality of RUs through UTP cables in a downstream direction, and separately outputting a plurality of UTP transmission frames, separately input from the RUs through the UTP cables in an upstream direction, to the upstream UTP transmission deframers in an upstream direction.

5. The cascade-type multiplex radio communication relay system according to claim 1, wherein each of the RUs comprises:

an RU UTP interface for outputting a UTP transmission frame, input from the MHU through a UTP cable in a downstream direction, to an RU communication signal processing unit in a downstream direction, and outputting a UTP transmission frame, input from the RU communication signal processing unit in an upstream direction, to the MHU through the UTP cable in an upstream direction;

the RU communication signal processing unit including a downstream UTP transmission deframer for converting a UTP transmission frame, input from the RU UTP interface in a downstream direction, into two different digital communication signals, and separately outputting the digital communication signals in a downstream direction, first and second downstream D/A converters for respectively converting the two different digital communication signals, input from the downstream deframer in a downstream direction, into IF communication signals, and separately outputting the IF communication signals to an RU radio communication interface in a downstream direction, first and second upstream A/D converters for respectively converting the two different IF communication signals, input from the RU radio communication interface in an upstream direction, into digital communication signals, and separately outputting the digital communication signals in an upstream direction, and an upstream UTP transmission framer for converting two different digital communication signals, separately input from the first and second upstream A/D converters in an upstream direction, into a single UTP transmission frame, and outputting the UTP transmission frame to the RU UTP interface in an upstream direction; and the RU radio communication interface including first and second downstream up-converters for respectively converting two different IF communication signals, separately input from the RU communication signal processing unit in a downstream direction, into RF communication signals, and separately outputting the RF communication signals in a downstream direction, a first downstream matching/amplification unit for adjusting a level of an RF communication signal, input from the first downstream up-converter in a downstream direction, amplifying the level-adjusted RF communication signal, and outputting the amplified RF communication signal in a downstream direction, a second downstream matching/amplification unit for adjusting a level of an RF communication signal, input from the second downstream up-converter in a downstream direction, amplifying the level-adjusted RF communication signal, and outputting the amplified RF communication signal in a downstream direction, a first duplexer for outputting the RF communication signal, input from the first downstream matching/amplification unit in a downstream direction, in a downstream direction, and outputting an RF communication signal, input in an upstream direction, to a first upstream matching/amplification unit in an upstream direction, a second duplexer for outputting the RF communication signal, input from the second downstream matching/amplification unit in a downstream direction, in a downstream direction, and outputting an RF communication signal, input in an upstream direction, to a second upstream matching/amplification unit in an upstream direction, the first upstream matching/amplification unit for amplifying the RF communication signal, input from the first duplexer in an upstream direction, adjusting a level of the amplified RF communication signal, and outputting the level-adjusted RF communication signal in an upstream direction, the second upstream matching/amplification unit for amplifying the RF communication signal, input from the second duplexer in an upstream direction, adjusting a level of the amplified RF communication signal, and outputting the level-adjusted RF communication signal in an upstream direction, a first upstream down-converter for converting the RF communication signal, input from the first upstream matching/amplification unit in an upstream direction, into an IF communication signal, and outputting the IF communication signal to the RU communication signal processing unit in an upstream direction, a second upstream down-converter for converting the RF communication signal, input from the second upstream matching/amplification unit in an upstream direction, into an IF communication signal, and outputting the IF communication signal to the RU communication signal processing unit in an upstream direction, and a diplexer for outputting the two different RF communication signals, separately input from the first and second duplexers in a downstream direction, to the antenna in a downstream direction, separating an RF communication signal, input from the antenna in an upstream direction, into two different communication signals, and separately outputting the communication signals to the first and second duplexers.

6. The cascade-type multiplex radio communication relay system according to claim 5, wherein the RU communication signal processing unit includes:

a downstream UTP transmission deframer for converting a UTP transmission frame, input from the RU UTP interface in a downstream direction, into a single digital communication signal, and outputting the digital communication signal in a downstream direction;

a downstream digital filter for converting the digital communication signal, input from the downstream UTP transmission deframer in a downstream direction, into two different digital communication signals, and separately outputting the digital communication signals in a downstream direction;

first and second downstream D/A converters for respectively converting the two different digital communication signals, input from the downstream digital filter in a downstream direction, into IF communication signals, and outputting the IF communication signals to the RU radio communication interface in an upstream direction;

first and second upstream A/D converters for respectively converting the two IF communication signals, input from the RU radio communication interface in an upstream direction, into digital communication signals, and separately outputting the digital communication signals;

an upstream summation unit for combining the two different digital communication signals, separately input from the first and second upstream A/D converters in an upstream direction, into a single digital communication signal, and outputting the digital communication signal to an upstream UTP transmission framer in an upstream direction; and the upstream UTP transmission framer for converting the two different digital communication signals, separately input from the first and second upstream A/D converters in an upstream direction, into a single UTP transmission frame, and outputting the UTP transmission frame to the RU UTP interface in an upstream direction.

* * * * *